United States Patent [19]

Baron et al.

[11] 4,064,195
[45] Dec. 20, 1977

[54] MODIFIED AROMATIC POLYCARBONATES

[75] Inventors: Arthur L. Baron; Parameswar Sivaramakrishnan, both of New Martinsville, W. Va.

[73] Assignee: Mobay Chemical Corporation, Pittsburgh, Pa.

[21] Appl. No.: 694,401

[22] Filed: June 9, 1976

Related U.S. Application Data

[63] Continuation-in-part of Ser. No. 580,375, May 22, 1975, abandoned.

[51] Int. Cl.² .............................................. C08L 67/00
[52] U.S. Cl. .................................................... 260/860
[58] Field of Search ................................. 260/860, 823

[56] References Cited

U.S. PATENT DOCUMENTS

| | | | |
|---|---|---|---|
| 2,914,556 | 11/1959 | Hostettler et al. | 260/860 |
| 2,977,385 | 3/1961 | Fowler et al. | 260/31.6 |
| 3,186,961 | 6/1965 | Sears | 260/860 |
| 3,892,821 | 7/1975 | Koleske et al. | 260/860 |

*Primary Examiner*—Howard E. Schain
*Assistant Examiner*—W. C. Danison, Jr.
*Attorney, Agent, or Firm*—Gene Harsh; Lawrence S. Pope

[57] ABSTRACT

Aromatic polycarbonate resin mixtures consisting essentially of an aromatic carbonate having the repetitive carbonate group

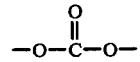

and in addition always the

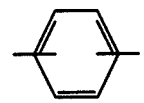

radical attached to a carbonate group and a modifying minor amount of a polycaprolactone polymer having the formula

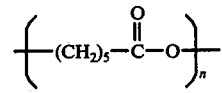

where $n$ is greater than 100 and less than 3000, exhibit, as compared to those of aromatic polycarbonates alone, e.g. improved melt stability. The modified polycarbonates are produced by intimately premixing the polycarbonate with minor selected amounts of polycaprolactone.

3 Claims, No Drawings

MODIFIED AROMATIC POLYCARBONATES

This is a continuation in part of abandoned application Ser. No. 580,375 filed May 22, 1975.

Mixtures of polycarbonates and cyclic ester polymers e.g. of epsilon-caprolactone are known according to U.S. Pat. Nos. 3,892,821 and 3,781,381 respectively German published Specification No. 2,251,714. The cyclic ester polymers can be present in amounts ranging from about 1 to about 95%, more preferably from about 2 to about 40% and most preferably from about 5 to about 30% based on the total weight of cyclic ester polymer and thermoplastic polymer e.g. thermoplastic polycarbonate.

Surprisingly polycarbonates containing about 0.5 percent by weight of polycaprolactone have improved melt stability as compared with the polycarbonate having added no polycaprolactone or 1 percent by weight or more polycaprolactone.

Thus the subject of the instant invention are resin mixtures consisting essentially of high molecular weight, thermoplastic, aromatic polycarbonate based on dihydric phenols, and between about 0.1 and about 0.95 weight percent, preferably between about 0.25 and 0.75 weight percent, referred to the total weight of polycarbonate and polycaprolactone, of a polycaprolactone polymer having the formula

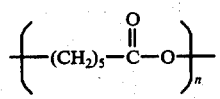

wherein $n$ is greater than 100 and less than 3000.

The mixtures according to the invention have also improved stress crack resistance and consequently the polycaprolactone modified aromatic polycarbonate is rendered suitable for uses which require the resin to come into even frequent contact with alkaline agents, for example, bottles which after use are sterilized in caustic solutions.

The polycaprolactone polymer suitable for the blends according to the instant invention is a partially crystalline thermoplastic resin having a repeating structure as follows

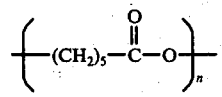

in which $n$ is greater than 100 and less than 3000. The polycaprolactone preferably has a reduced viscosity (measured with 0.2 g of polymer in 100 milliliters benzene at 30° C) of about 0.1 to 1.5, more preferably of about 0.5 to 0.9 (Polycaprolactones of this type can be obtained as PCL - 700 from the Union Carbide Corporation, Bulletin F44 221).

The polycaprolactone polymer is a linear polyester formed through the ring opening reaction of ε-caprolactone. Even though polycaprolactone is known to decompose at temperatures in excess of 200° to 250° and though addition of crystalline solids are generally known to destroy the notched impact strength and especially the transparency of aromatic polycarbonates, the blends of this invention do not exhibit these disadvantages; the polycaprolactone can be added in amounts of about 0.25 to 0.75 percent by weight and compatible blends are formed as evidenced by the optical characteristics of the aromatic polycarbonate blend.

The high molecular weight, thermoplastic, aromatic polycarbonates suitable for the blends according to the instant invention are the known polycarbonates which are manufactured from dihydric phenols, such as resorcinol, hydroquinone, dihydroxydiphenyls and especially bis-(hydroxylphenyl)-alkanes, e.g. bis-(4-hydroxyphenyl)-propane-2.2 (Bisphenol A), bis-(3.5-dimethyl-4-hydroxy-phenyl)-propane-2.2, and from α,α'-Bis-(hydroxyphenyl)-dialkylidene-benzenes e.g. α,α'-bis-(4-hydroxyphenyl)-p-diisopropylbenzene, halogenated bis-(hydroxyphenyl)-alkanes, such as, for example, bis-(3.5-dichloro-4-hydroxyphenyl)-propane-2.2 or bis-(3.5-dibromo-4-hydroxyphenyl)-propane-2.2, bis-(hydroxyphenyl)-cycloalkanes-, sulphones or -ethers, optionally mixed with glycols, and derivatives of carbonic acid, for example its diesters or dihalides, optionally conjointly using minor amounts of dicarboxylic acids or their derivatives which are suitable for ester formation, these polycarbonates possessing an average weight molecular weight ($\overline{MW}$) of at least about 10,000, preferably of between about 25,000 and about 200,000, determined via viscosity measurements in $CH_2Cl_2$ at 25° C and a concentration of 0.5% by weight.

Such high molecular weight, thermoplastic aromatic polycarbonates are e.g. described in U.S. Pat. No. 3,028,365.

The blends of the invention can be prepared by mixing the polycarbonate and the polycaprolactone in known manner. The mixtures obtained can be extruded or formed by injection molding as it is known for the extrusion and injection molding of high molecular weight, thermoplastic polycarbonates. Known additives and fillers for polycarbonates can be used in the blends of the invention, too, for example dyestuffs, pigments, stabilizing agents against the effect of moisture, heat and ultra-violet radiation, glass powders and glass fibers.

The following Table 1 reports the rheological properties of blends of polycarbonate and polycaprolactone. The polycarbonate used is that used in the following Example 1; the polycaprolactone used is that used in the following Example 1. Both are blended as described in Example 1.

Table 1

| RHEOLOGICAL PROPERTIES OF BISPHENOL A POLYCARBONATE - POLYCAPROLACTONE BLENDS | | | | |
|---|---|---|---|---|
| Polycaprolactone in blend, % by weight | 0 | 0.5 | 1.0 | |
| Melt flow rate (g/10 min.) | 5.2 | 4.6 | 5.6 | measured according ASTM D-1238 |
| Spiral flow+ at 625° F (1/2" × 1/16 cavity) inches of flow | 6 | — | 7.0 | |
| Melt stability 300° C (poise × $10^4$) at 72 $sec^{-1}$ | | | | |
| after 5 min. | | 0.81 | 0.88 | 0.76 |
| after 35 min. | | 0.75 | 0.78 | 0.66 |
| after 65 min. | | 0.74 | 0.80 | 0.61 |
| Melt viscosity at variable shear rates | | | | |
| 7.2 $sec^{-1}$ poise × $10^4$ | | 0.91 | 0.96 | 0.91 |
| 14.4 " " | | 0.90 | 0.96 | |
| 36.0 " " | | 0.83 | 0.90 | 0.79 |
| 72.0 " " | | 0.81 | 0.88 | 0.76 |
| 144.0 " " | | 0.77 | 0.83 | 0.71 |
| 360.0 " " | | 0.66 | 0.71 | 0.61 |
| 720.0 " " | | 0.54 | 0.58 | 0.51 |
| 1440.0 " " | | 0.41 | 0.43 | 0.38 |

The foregoing Table 1 shows that at the proportion of about 0.5 parts of polycaprolactone by weight per hundred parts of polycarbonate, the melt stability and melt viscosity are increased and the melt flow rate is decreased, surprisingly contrary to the general effect created by increased additions of polycaprolactone.

The following first three specific examples especially illustrate the increased stress crack resistance provided by addition of polycaprolactone to a polycarbonate resin, which alone will stress crack after 3 hours immersion in aqueous sodium hydroxide. Example 2 employs the optimum relative quantity of polycaprolactone so far as improvement in stress crack resistance is concerned.

EXAMPLE 1

A bisphenol-A polycarbonate resin having a molecular weight of about 30,000 and a melt viscosity of 500,000 poises at 245° C and 5,000 poises at 315° C and 0.25 phr of polycaprolactone of the type above described having a reduced viscosity of 0.7 measured with 0.2 g of polymer in 100 milliliters of benzene at 30° C were tumbled for about 5 minutes and then extruded in a Warton-Hartig extruder using a single screw with a compression ratio of 1.75 to 1. Two passes were made to insure better dispersion of polymers in the bisphenol-A polycarbonate. Molded specimens were then prepared having a dimension of 1/16 inch by ½ inch by 3½ inches. These specimens were flexed in a jig to an angle of about 180° and the flexed specimen was then placed in a 3.5% aqueous solution of sodium hydroxide and held there at a temperature of 135° F. First stress crazing or cracks were observed after an immersion of 4 hours.

EXAMPLE 2

The conditions of Example 1 were repeated with the exception that 0.5 phr of the polycaprolactone were blended with a bisphenol-A polycarbonate. In this instance the flexed bar was observed to show the first crazing or stress cracking after 6 hours.

EXAMPLE 3

The conditions of Example 1 were repeated except that 0.75 phr of the polycaprolactone was blended with a bisphenol-A polycarbonate. Stress cracking was observed to begin after 5 hours immersion. Blends of 1.0, 2.5, and 5.0 phr produced no stress crack improvement. The optimum amount therefore established when employing bisphenol-A polycarbonate and the polycaprolactone 700 hereinabove described was shown to be 0.50 phr. This optimum blend when blow molded into bottles and having a stress crack resistance as above demonstrated of 6 hours will successfully undergo 35 cleaning cycles of 10 minutes each in 3.5% sodium hydroxide at 135° F before exhibiting any stress crazing. Thus this stress cracking resistance is safely above, in the number of times that it can undergo the cleaning cycle, the number of times that a single blown bottle will be recycled. In other words, it is well above the average number of recycles that any returnable blown bottle would be called upon to encounter.

EXAMPLES 4-6

The polycarbonate used in Example 1 has been blended with the polycaprolactone used in Example 1. Some properties are compared with the corresponding properties of polycarbonate in the following Table 2:

Table 2

| Example No. | 4 | 5 | 6 | |
|---|---|---|---|---|
| Polycaprolactone-700; phr (% by weight) | 0 | 0.5 | 1.0 | |
| Haze; (%) | 2.0 | 2.0 | 2.6 | measured according ASTM D 1003 |
| Glass Transition Temp.; (° C) | 146 | 147 | 146 | |
| Time to stress cracking (cf. above); hrs. | 3 | 6 | 2 | |
| Notched Izod Impact Strength (ft.lb./in. at ⅛") | 16.7 | — | 17.0 | measured according ASTM D-256 |

As can be seen by inspection of the foregoing Table 2, there is a striking maintenance of optical clarity, the glass transition temperature, and notched impact strength even at 1.0 phr. However, at between 0.5 and 1.0 phr the increased stress cracking resistance is lost.

It is important to the uniform production of the polyblends of invention that the polycarbonate and the additive or modifier, polycaprolactone, be intimately mixed prior to the initial formation of the blend. With most polycarbonates this can be readily accomplished by milling the two ingredients and then melting and extruding the melt as solid strands of polyblend which are then chopped into pellets. Another means of premixing prior to extrusion consists of feeding the molten polycaprolactone into the polycarbonate melt prior to extrusion. Solutions of each of the ingredients of the polyblend can be mixed and then precipitated together either by evaporation of the cosolvents or by water flooding. The resulting polybend can be used or melted and extruded to form pellets.

Although the invention has been described in detail in the foregoing doe the purpose of illustration, it is to be understood that such detail is solely for that purpose and that variations can be made therein by those skilled in the art without departing from the spirit and scope of the invention except as it may be limited by the claims.

We claim:

1. Resin mixtures consisting essentially of high molecular weight, thermoplastic polycarbonate based on dihydric phenols, and between about 0.1 and about 0.95 weight percent, referred to the total weight of polycarbonate and polycaprolactone of a polycaprolactone polymer having the repeating units given by the formula

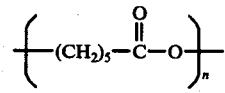

wherein $n$ is greater than 100 and less than 3000.

2. Resin mixtures according to claim 1, having between 0.25 and 0.75 weight percent, referred to the total weight of polycarbonate and polycaprolactone, of the polycaprolactone polymer.

3. Resin mixtures according to claims 1 and 2 wherein the polycaprolactone polymer has a reduced viscosity of between 0.1 and 1.5